(12) United States Patent
Li et al.

(10) Patent No.: US 11,705,610 B2
(45) Date of Patent: Jul. 18, 2023

(54) END COVER ASSEMBLY, BATTERY CELL, DEGASSING METHOD, BATTERY, AND ELECTRIC APPARATUS

(71) Applicant: JIANGSU CONTEMPORARY AMPEREX TECHNOLOGY LIMITED, Liyang (CN)

(72) Inventors: Quankun Li, Liyang (CN); Wenwei Chen, Liyang (CN)

(73) Assignee: JIANGSU CONTEMPORARY AMPEREX TECHNOLOGY LIMITED, Liyang (CN)

(*) Notice: Subject to any disclaimer, the term of this patent is extended or adjusted under 35 U.S.C. 154(b) by 0 days.

(21) Appl. No.: 17/872,181

(22) Filed: Jul. 25, 2022

(65) Prior Publication Data

US 2022/0359963 A1 Nov. 10, 2022

Related U.S. Application Data

(63) Continuation of application No. PCT/CN2021/073160, filed on Jan. 21, 2021.

(30) Foreign Application Priority Data

Nov. 16, 2020 (CN) .......................... 202011276284.9

(51) Int. Cl.
*H01M 50/591* (2021.01)
*H01M 50/358* (2021.01)
(Continued)

(52) U.S. Cl.
CPC ....... *H01M 50/591* (2021.01); *H01M 50/358* (2021.01); *H01M 50/325* (2021.01)

(58) Field of Classification Search
CPC ............. H01M 50/358; H01M 50/367; H01M 50/325; H01M 50/30; H01M 50/591
See application file for complete search history.

(56) References Cited

U.S. PATENT DOCUMENTS 5,538,807 A * 7/1996 Hagiuda ............. H01M 50/325
429/100
7,993,778 B2 8/2011 Yim et al.
(Continued)

FOREIGN PATENT DOCUMENTS

CN 1713445 A 12/2005
CN 1977416 A 6/2007
(Continued)

OTHER PUBLICATIONS

International Search Report of Application No. PCT/CN2021/073160 dated Mar. 25, 2021.
(Continued)

*Primary Examiner* — Ula C Ruddock
*Assistant Examiner* — Amanda Rosenbaum
(74) *Attorney, Agent, or Firm* — Kilpatrick Townsend & Stockton LLP

(57) ABSTRACT

This application relates to an end cover assembly, a battery cell, a degassing method, a battery, and an electric apparatus. The end cover assembly includes: an end cover plate provided with a degassing hole, where the degassing hole penetrates through the end cover plate; and a degassing apparatus mounted in the degassing hole, where the degassing apparatus includes a columnar portion, a first limiting portion, a second limiting portion, a first elastic member, and a second elastic member. The columnar portion penetrates through the degassing hole. The first limiting portion and the second limiting portion are respectively located on an outer side and an inner side of the end cover plate. The first elastic member is located between the first limiting portion and the end cover plate. The second elastic member is located between the second limiting portion and the end cover plate.

13 Claims, 8 Drawing Sheets

(51) Int. Cl.
*H01M 50/325* (2021.01)
*H01M 50/367* (2021.01)
*H01M 50/30* (2021.01)
*H01M 50/35* (2021.01)
*H01M 50/15* (2021.01)
*H01M 10/052* (2010.01)
*H01M 50/392* (2021.01)

(56) References Cited

U.S. PATENT DOCUMENTS

| | | |
|---|---|---|
| 10,734,625 B2 | 8/2020 | Tsang et al. |
| 2008/0166625 A1* | 7/2008 | Schembri ............ H01M 50/308 429/53 |
| 2017/0098807 A1* | 4/2017 | Umeyama ............ H01M 50/325 |
| 2018/0159101 A1 | 6/2018 | Tsang et al. |
| 2019/0355944 A1 | 11/2019 | Chen et al. |
| 2020/0411824 A1 | 12/2020 | Tsang |
| 2021/0074974 A1* | 3/2021 | Kim .................. H01M 50/3425 |
| 2021/0396323 A1* | 12/2021 | Nakayama ........... H05K 5/0213 |

FOREIGN PATENT DOCUMENTS

| | | |
|---|---|---|
| CN | 102299273 A | 12/2011 |
| CN | 203553251 U * | 4/2014 |
| CN | 203553251 U | 4/2014 |
| CN | 105932181 A | 9/2016 |
| CN | 107112473 A | 8/2017 |
| CN | 107293656 A | 10/2017 |
| CN | 208173641 U | 11/2018 |
| CN | 110429214 A | 11/2019 |
| CN | 112103414 A | 12/2020 |
| JP | 2006092864 A | 4/2006 |
| KR | 20070082943 A | 8/2007 |
| KR | 101022634 B1 | 3/2011 |

OTHER PUBLICATIONS

Written Opinion of Application No. PCT/CN2021/073160 dated Mar. 25, 2021.
Chinese OA1 for corresponding counterpart application 202011276284.9 mailed Dec. 24, 2020.
The first Office Action received in corresponding Chinese Application 202110203785.2, dated Aug. 29, 2022.

* cited by examiner

A-A

Apply a force F toward an end cover plate to a degassing apparatus, so that a first limiting portion and a second limiting portion produce same displacement, and a first elastic member is at least partially compressed and a second elastic member is at least partially released to undo sealing of a degassing hole in the end cover plate by the second elastic member, allowing gas to circulate between the inside and the outside of a housing of a battery cell through the degassing hole — S410

Remove the force applied to the degassing apparatus to bring the degassing apparatus back to a normal state, where the second elastic member is in sealed contact with the second limiting portion and the end cover plate, keeping the degassing hole in a sealed state — S420

FIG. 11

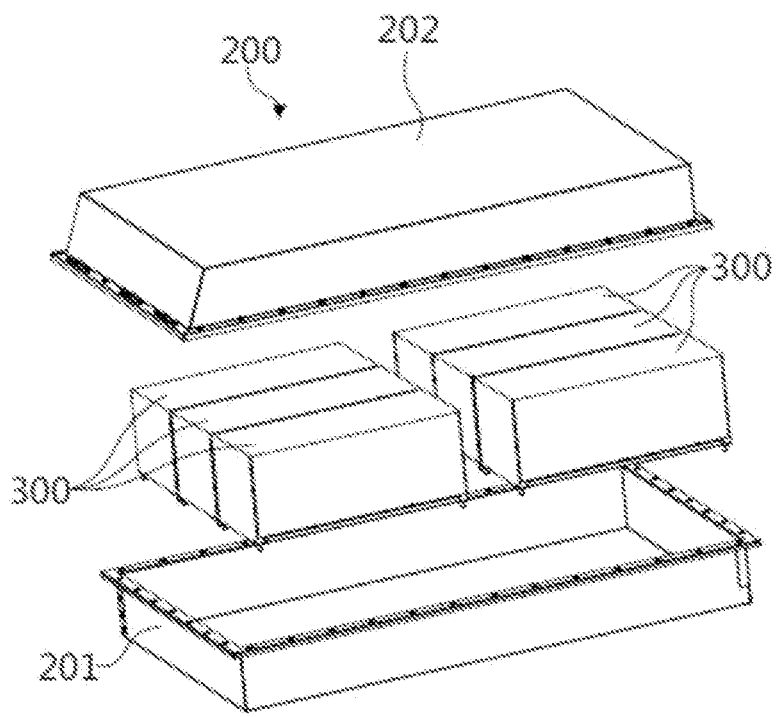

FIG. 12

END COVER ASSEMBLY, BATTERY CELL, DEGASSING METHOD, BATTERY, AND ELECTRIC APPARATUS

CROSS-REFERENCE TO RELATED APPLICATIONS

This application is a continuation of PCT/CN2021/073160 filed on Jan. 21, 2021 and claims priority to Chinese Patent Application No. 202011276284.9, filed on Nov. 16, 2020 and entitled "END COVER ASSEMBLY, BATTERY CELL, DEGASSING METHOD, BATTERY, AND ELECTRIC APPARATUS", which is incorporated herein by reference in its entirety.

TECHNICAL FIELD

Embodiments of this application relate to the field of batteries, and in particular, to an end cover assembly, a battery cell, a degassing method, a battery, and an electric apparatus.

BACKGROUND

Currently, a commonly used battery cell typically includes a housing, an electrode assembly accommodated in the housing, and an end cover assembly fixed to the housing. The battery cell may also be referred to as a secondary battery, for example, a lithium-ion battery. The housing is typically a hollow chamber with an opening. The end cover assembly and the housing are combined at the opening of the housing to form a sealed accommodation cavity for accommodating the electrode assembly.

During use, the electrode assembly undergoes a plurality of charge and discharge cycles, and gas in the accommodation cavity inevitably continues to increase, and a continuous increase of pressure in the accommodation cavity causes serious impact on service life and safety of the battery cell.

In addition, the battery cell requires a highly sealed structure. During use, no electrolyte shall leak to pollute surrounding air or environment, and no water vapor shall enter the battery cell and react with the electrolyte to reduce the service life of the battery cell.

Therefore, in some cases, the battery cell can exhaust internal gas only once. When excessive gas is produced in the battery cell, a disposed safety apparatus (for example, an explosion-proof valve) bursts to relieve internal pressure and avoid safety accidents, but the service life of the battery cell also ends.

SUMMARY

In view of the foregoing problem, this application provides an end cover assembly, a battery cell, a degassing method, a battery, and an electric apparatus, to allow a plurality of degassing processes for a battery cell and avoid electrolyte leakage, thereby effectively avoiding excessively high pressure in the battery cell and increasing service life of the battery cell.

According to a first aspect of this application, an end cover assembly is provided, configured to seal a housing of a battery cell, and including:

an end cover plate provided with a degassing hole, where the degassing hole penetrates through the end cover plate along an axial direction the degassing hole; and a degassing apparatus mounted in the degassing hole, where the degassing apparatus includes a columnar portion, a first limiting portion, a second limiting portion, a first elastic member, and a second elastic member, the columnar portion penetrates through the degassing hole, the first limiting portion and the second limiting portion surround an outer peripheral surface of the columnar portion and are respectively located on an outer side and an inner side of the end cover plate along the axial direction of the degassing hole, the first elastic member is located between the first limiting portion and the end cover plate, and the second elastic member is located between the second limiting portion and the end cover plate.

When the degassing apparatus is in a normal state, the second elastic member is in sealed contact with the second limiting portion and the end cover plate, keeping the degassing hole in a sealed state. When the degassing apparatus experience a force toward the end cover plate, the first limiting portion and the second limiting portion are configured to produce same displacement, and the first elastic member is at least partially compressed and the second elastic member is at least partially released to undo sealing of the degassing hole by the second elastic member, allowing gas to circulate between the inside and the outside of the housing through the degassing hole.

In the end cover assembly provided in this application, an end cover plate with a degassing hole and a degassing apparatus are provided. In a normal state, the degassing apparatus can seal the degassing hole to prevent gas circulation between the inside and the outside of the battery cell. However, when degassing is required, a force toward the end cover plate is applied to the degassing apparatus to undo the sealing of the degassing hole by the degassing apparatus, allowing gas to circulate between the inside and the outside of the housing of the battery cell through the degassing hole. After the degassing ends, the force applied to the degassing apparatus is removed, the degassing apparatus can return to the normal state again to seal the degassing hole and avoid electrolyte leakage, and the battery cell can continue to be used.

In some embodiments, a first degassing gap is provided between the columnar portion and a hole wall of the degassing hole, and the first degassing gap allows gas to circulate between the inside and the outside of the end cover plate.

Therefore, when the first degassing gap is in an unsealed state, gas in an enclosure is directly exhausted through the first degassing gap, thereby implementing degassing for the battery cell.

In some embodiments, the columnar portion and the degassing hole are in clearance fit to form the first degassing gap.

In some embodiments, the first limiting portion is provided with a mounting through-hole, and the columnar portion is inserted into the mounting through-hole and fixedly connected to the first limiting portion.

A second degassing gap is provided between the first limiting portion and the columnar portion, and gas circulates between the inside and the outside of the end cover plate through the first degassing gap and the second degassing gap.

Therefore, when the first degassing gap is in an unsealed state, gas in the enclosure enters the second degassing gap through the first degassing gap, and is exhausted out of the battery cell through the second degassing gap, thereby implementing degassing for the battery cell.

In some embodiments, the first limiting portion and the columnar portion are in clearance fit to form the second degassing gap.

In some embodiments, the second degassing gap is a recessed portion formed into a hole wall of the mounting through-hole, and the recessed portion is recessed away from the columnar portion.

The recessed portion into the hole wall of the mounting through-hole forms the second degassing gap, so that the amount of gas exhausted from the battery cell can be increased.

In some embodiments, the first limiting portion is provided with a first groove, the first groove is provided around a periphery of the mounting through-hole, and the columnar portion is at least partially located in the first groove.

Whether the columnar portion is compressed in place can be determined by observing a degree of the columnar portion sinking into the first groove. In addition, when an end of the columnar portion is located in the first groove, a plane is formed between the end of the columnar portion and an upper surface of the first limiting portion, an overall volume of the battery cell is reduced, and a surface of the enclosure is more smooth and aesthetically pleasing.

In some embodiments, a second groove is provided in the end cover plate at a location corresponding to the second elastic member, the second groove is provided around a periphery of the degassing hole, and the second elastic member is at least partially located in the second groove.

The second groove is provided, so that a volume occupied by the degassing apparatus in the enclosure can be reduced, and the volume of the battery cell is further reduced.

In some embodiments, the first elastic member and the second elastic member are both made of fluorine rubber.

The fluorine rubber is a rubber material with high stability and high temperature resistance, so that the second elastic member can completely seal the first degassing gap, and the first elastic portion can ensure sealing between the first limiting portion and the end cover plate in a compressed state.

According to a second aspect of this application, a battery cell is provided, including an electrode assembly, a housing, and the end cover assembly in the foregoing embodiment.

The housing is a hollow chamber with an opening, and the end cover assembly and the housing are combined at the opening to form a space for accommodating the electrode assembly.

According to a third aspect of this application, a battery is provided, including the battery cell in the foregoing embodiment.

According to a fourth aspect of this application, an apparatus using a battery is provided, including the battery in the foregoing embodiment.

According to a fifth aspect of this application, a degassing method for the battery cell is provided, including:

applying a force toward the end cover plate to the degassing apparatus, so that the first limiting portion and the second limiting portion produce same displacement, and the first elastic member is at least partially compressed and the second elastic member is at least partially released to undo sealing of the degassing hole in the end cover plate by the second elastic member, allowing gas to circulate between the inside and the outside of the housing of the battery cell through the degassing hole; and removing the force applied to the degassing apparatus to bring the degassing apparatus back to a normal state, where the second elastic member is in sealed contact with the second limiting portion and the end cover plate, keeping the degassing hole in a sealed state.

In embodiments, the force applied to the degassing apparatus is applied to the first limiting portion.

When the degassing apparatus experiences the force toward the end cover plate, the first limiting portion and the second limiting portion are configured to produce the same displacement, and the force causes a change of a compression degree of the first elastic member and the second elastic member, so that a location of the degassing apparatus with respect to the end cover plate changes, and the first elastic member is at least partially compressed and the second elastic member is at least partially released to undo the sealing of the degassing hole by the second elastic member.

In some embodiments, the force applied to the degassing apparatus is parallel to an axial direction of the degassing hole.

The force applied to the degassing apparatus is parallel to the axial direction of the degassing hole, thereby preventing friction between the columnar portion and a hole wall of the degassing hole.

In the end cover assembly provided in this application, an end cover plate with a degassing hole and a degassing apparatus are provided, and the degassing apparatus is mounted in the degassing hole in the end cover plate. In a normal state, the degassing apparatus can seal the degassing hole to prevent gas circulation between the inside and the outside of the battery cell. However, when degassing is required, the force toward the end cover plate is applied to the degassing apparatus to undo the sealing of the degassing hole by the degassing apparatus, allowing gas to circulate between the inside and the outside of the housing of the battery cell through the degassing hole. After the degassing ends, the force applied to the degassing apparatus is removed, the degassing apparatus can return to the normal state again to seal the degassing hole and avoid electrolyte leakage, and the battery cell can continue to be used. Therefore, when the end cover assembly in this application is used for the battery cell, a plurality of degassing processes is allowed for the battery cell, without causing permanent damage to the battery cell, thereby increasing service life of the battery cell while ensuring safety of using the battery cell.

The foregoing descriptions are merely brief descriptions of the technical solutions in the embodiments of this application. For a clearer understanding of the technical means in the embodiments of this application, the technical solutions may be implemented according to the content of the specification. In addition, to make the foregoing and other objectives, features, and advantages of the embodiments of this application more comprehensible, the following particularly describes specific implementations of this application.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show some embodiments of this application, and persons of ordinary skill in the art may derive other drawings from these accompanying drawings without creative efforts.

FIG. 11 is a flowchart of a degassing method for a battery cell according to an embodiment of this application.

FIG. 12 is a schematic structural diagram of a battery according to an embodiment of this application.

DESCRIPTION OF EMBODIMENTS

Figure 1:
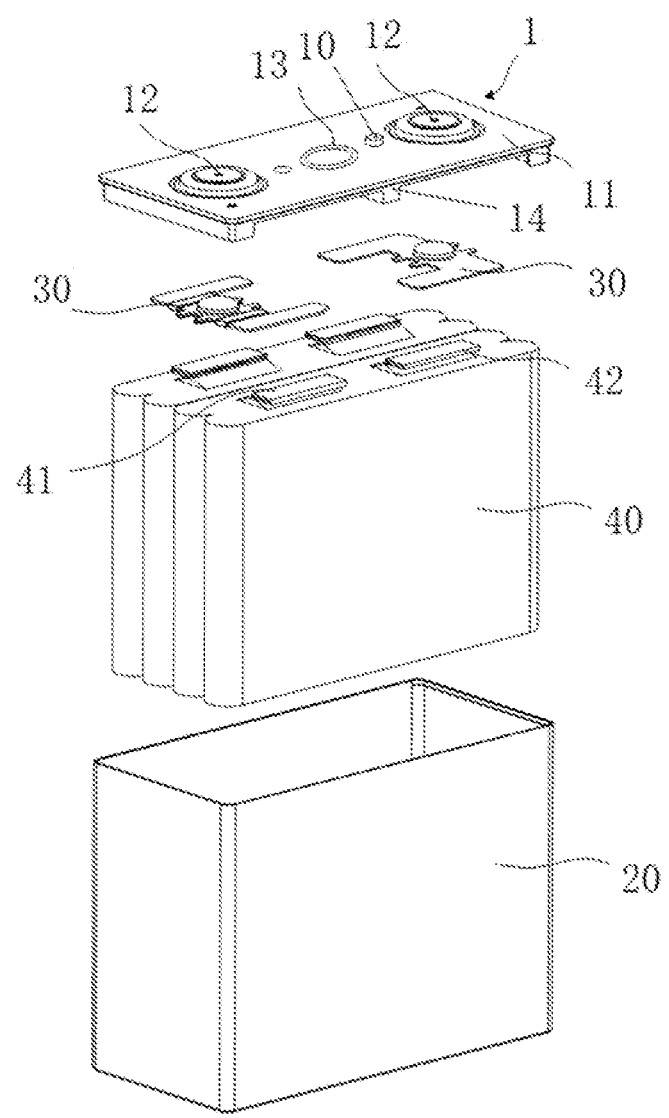
FIG. 1 is a partial schematic structural exploded view of a battery cell according to an embodiment of this application.

To make the objectives, technical solutions, and advantages of the embodiments of this application clearer, the following clearly describes the technical solutions in the embodiments of this application with reference to the accompanying drawings in the embodiments of this application. Apparently, the described embodiments are some but not all of the embodiments of this application. All other embodiments obtained by persons of ordinary skill in the an based on the embodiments of this application without creative efforts shall fall within the protection scope of this application.

Unless otherwise defined, meanings of all technical and scientific terms used in the specification are the same as those commonly understood by persons skilled in the art of this application. The terms used in the specification of this application are merely intended to describe specific embodiments, but not to limit this application.

The terms "comprise", "include", and any variants thereof in the descriptions of the specification, claims, and accompanying drawings of this application are intended to cover a non-exclusive inclusion. The word "a" or "an" does not exclude existence of more than one. In the descriptions of this application, unless otherwise specified, "a plurality of" means more than two (including two). Similarly, "a plurality of groups of" means more than two groups (including two groups).

The "embodiment" mentioned in the specification means that a specific feature, structure, or characteristic described with reference to the embodiment may be included in at least one embodiment of this application. The phrase "embodiment" appearing in various locations in the specification does not necessarily mean a same embodiment, and is neither an independent or alternative embodiment mutually exclusive with other embodiments. It is explicitly and implicitly understood by persons skilled in the art that the embodiments described in the specification may be combined with other embodiments.

In the descriptions of this application, it should be noted that, unless otherwise specified and defined explicitly, the terms "mounting", "interconnection", and "connection" should be understood in a broad sense. For example, the "interconnection" or "connection" of a mechanical structure may be a physical connection. For example, the physical connection may be a fixed connection, for example, a fixed connection by using a fastener, such as a fixed connection by using a screw, a bolt, or other fasteners; or the physical connection may be a detachable connection, such as a clamping or buckling connection; or the physical connection may be an integrated connection, for example, a connection through welding, bonding, or integral molding. The "interconnection" or "connection" of a circuit structure may be a physical connection, or may be an electrical connection or a signal connection. For example, the "interconnection" or "connection" of the circuit structure may be a direct connection, that is, a physical connection; or may be an indirect connection through at least one intermediate element, provided that the circuit is connected; or may be an internal connection between two elements. The signal connection may be a signal connection through a circuit, or may be a signal connection through a medium, such as a radio wave. Persons of ordinary skill in the art can understand specific meanings of these terms in this application based on specific situations.

In the descriptions of the specification, it should be understood that the positional terms such as "up" and "down" described in the embodiments of this application are described as seen from the angles shown in the accompanying drawings, and should not be understood as limitations on the embodiments of this application.

In addition, in the specification, claims, or accompanying drawings of this application, the terms "first", "second", and the like are intended to distinguish between different objects but do not indicate a particular order, and may explicitly or implicitly include one or more features. The following further describes this application in detail by using specific embodiments and with reference to the accompanying drawings.

FIG. 1 is a partial schematic structural exploded view of a battery cell according to an embodiment of this application. The battery cell may be a secondary battery or a primary battery, for example, a lithium-ion secondary battery, a lithium-ion primary battery, a lithium-sulfur battery, a sodium-lithium-ion battery, or a magnesium-ion battery, but is not limited to thereto. The battery cell may be cylindrical, flat, rectangular, or in another shape. In another embodiment of this application, a plurality of battery cells may be stacked. For example, the plurality of battery cells may be connected in series, in parallel, or in series-parallel to form a battery module, a battery group, or a battery pack. The series-parallel connection is a combination of series and parallel connections. For brevity of description, in this specification, the battery module, the battery group, or the battery pack may be referred to as a battery.

The battery cell includes an enclosure and one or more electrode assemblies 40 placed in the enclosure. The enclosure includes an end cover assembly 1 and a housing 20. The enclosure is a hollow chamber. For example, a surface of the housing 20 has an opening, that is, the plane does not have a housing wall, so that the inside and the outside of the housing 20 are connected, and the electrode assembly 40 can be accommodated in the housing 20. The end cover assembly 1 is combined with the housing 20 at the opening of the housing 20 to form a hollow chamber. After the electrode assembly 40 is placed in the enclosure, the enclosure is filled with electrolyte and sealed.

A shape of the housing 20 is determined based on a shape of the combined one or more electrode assemblies 40. For example, the housing 20 may be a hollow cuboid, a hollow cube, or a hollow cylinder. For example, when the housing 20 is a hollow cuboid or cube, one plane of the housing 20 is a plane with an opening, that is, the plane does not have a housing wall, so that the inside and the outside of the housing 20 are connected; or when the housing 20 is a hollow cylinder, one circular side surface of the housing 20 is a surface with an opening, that is, the circular side surface does not have a housing wall, so that the inside and the outside of the housing 20 are connected.

In another embodiment of this application, the housing 20 may be made of a metal material or plastic. In some embodiments, the housing 20 is made of aluminum or an aluminum alloy.

Figure 2:
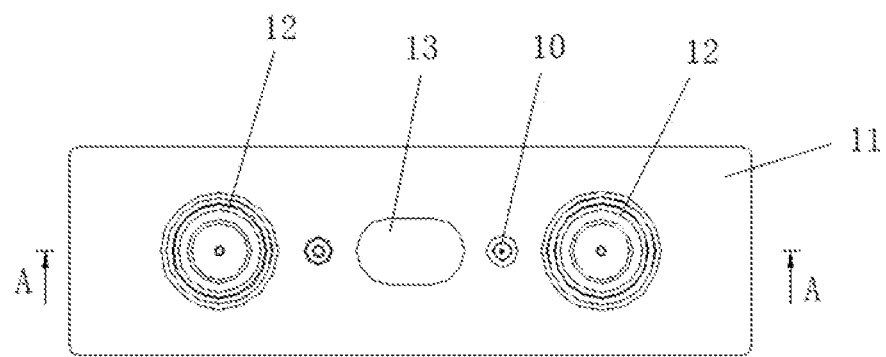
FIG. 2 is a schematic enlarged top view of an end cover assembly in FIG. 1.
Figure 3:
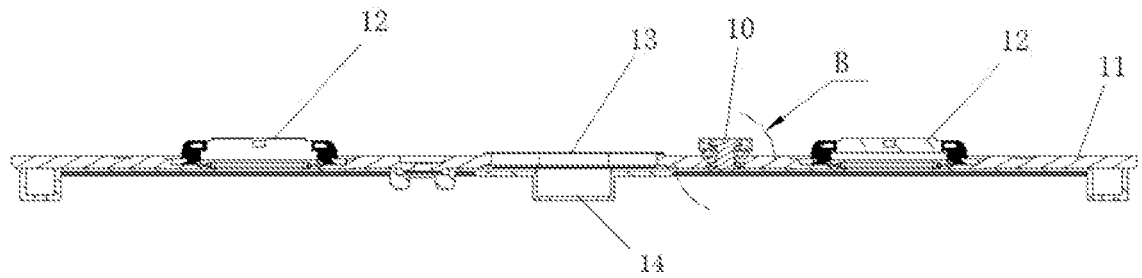
FIG. 3 is a schematic structural cross-sectional view of the end cover assembly in FIG. 2 along an A-A direction.

FIG. 2 is a schematic enlarged top view of the end cover assembly 1 in FIG. 1, and FIG. 3 is a schematic structural cross-sectional view of the end cover assembly 1 in FIG. 2 along an A-A direction. With reference to FIG. 1 to FIG. 3, the end cover assembly 1 includes a degassing apparatus 10, an end cover plate 11, two electrode terminals 12, and an insulator 14. The end cover plate 11 is basically in a shape of a flat plate. The end cover plate 11 is combined with the housing 20 at the opening of the housing 20, and covers the opening of the housing 20. For example, the end cover plate 11 may be a metal plate and is connected to the housing 20 through welding, so that the electrode assembly 40 is sealed in the housing 20.

The end cover plate 11 is provided with two penetrating terminal holes, and the two electrode terminals 12 are disposed on an upper surface of the end cover plate 11. The upper surface of the end cover plate 11 is a surface of the end cover plate 11 that is away from the electrode assembly 40. A surface of the end cover plate 11 that is close to the electrode assembly 40 may be referred to as a lower surface of the end cover plate 11. Each electrode terminal 12 covers a corresponding terminal hole. A seal ring is disposed between the end cover plate 11 and the electrode terminal 12, and the terminal hole can be sealed by compressing the seal ring. The two electrode terminals 12 are a positive-electrode terminal and a negative-electrode terminal. Each electrode terminal 12 is provided with a corresponding current collecting member 30. The current collecting member 30 is located between the end cover plate 11 and the electrode assembly 40.

In another embodiment of this application, the insulator 14 is disposed on the lower surface of the end cover plate 11 to isolate the end cover plate 11 from the electrode assembly 40 to reduce a short circuit risk.

Each electrode assembly 40 has a positive-electrode tab 41 and a negative-electrode tab 42. A positive-electrode tab 41 of the one or more electrode assemblies 40 is connected to the positive-electrode terminal through a current collecting member 30. A negative-electrode tab 42 of the one or more electrode assemblies 40 is connected to the negative-electrode terminal through another current collecting member 30.

During use of the battery cell, if the battery cell is overcharged, spiked by a needle, struck by a plate, or the like, the electrode assembly 40 is short-circuited and generates a large amount of gas. The gas gathers in the enclosure, which is likely to cause an explosion. Therefore, to improve safety performance of the battery cell, an explosion-proof valve 13 may be further disposed on a flat surface of the end cover plate 11 in this embodiment of this application.

The explosion-proof valve 13 may be a part of the flat surface of the end cover plate 11; or the end cover plate 11 may be provided with an explosion-proof through-hole, and the explosion-proof valve 13 is disposed on the end cover plate 11 and seals the explosion-proof through-hole. The explosion-proof valve 13 can cover the explosion-proof through-hole and isolate internal space of the enclosure from the outside to prevent the electrolyte in the enclosure from leaking through the explosion-proof through-hole.

The explosion-proof valve 13 has a weak area. Compared with other areas of the explosion-proof valve 13, the weak area has weaker strength and is easier to break. In this embodiment of this application, the weak area may be ring-shaped.

In this embodiment of this application, strength of the weak area may be reduced by reducing a thickness of the weak area. For example, the thickness of the weak area is less than that of the other areas of the explosion-proof valve 13.

In a normal state, the explosion-proof valve 13 and the end cover plate 11 are combined in a sealed manner, and space formed by the enclosure is airtight.

A large amount of gas is released when the electrode assembly 40 is short-circuited. With an increase of gas, pressure in the enclosure of the battery cell gradually increases. The explosion-proof valve 13 is deformed under an action of the pressure. When the pressure in the enclosure reaches a specific value, the explosion-proof valve 13 breaks at the weak area, and high-pressure gas breaks through the explosion-proof valve 13 and is exhausted out of the enclosure of the battery cell, to achieve a purpose of pressure relief and reduce an explosion risk. However, in this case, the battery cell cannot continue to be used due to permanent damage to the enclosure.

Figure 4:
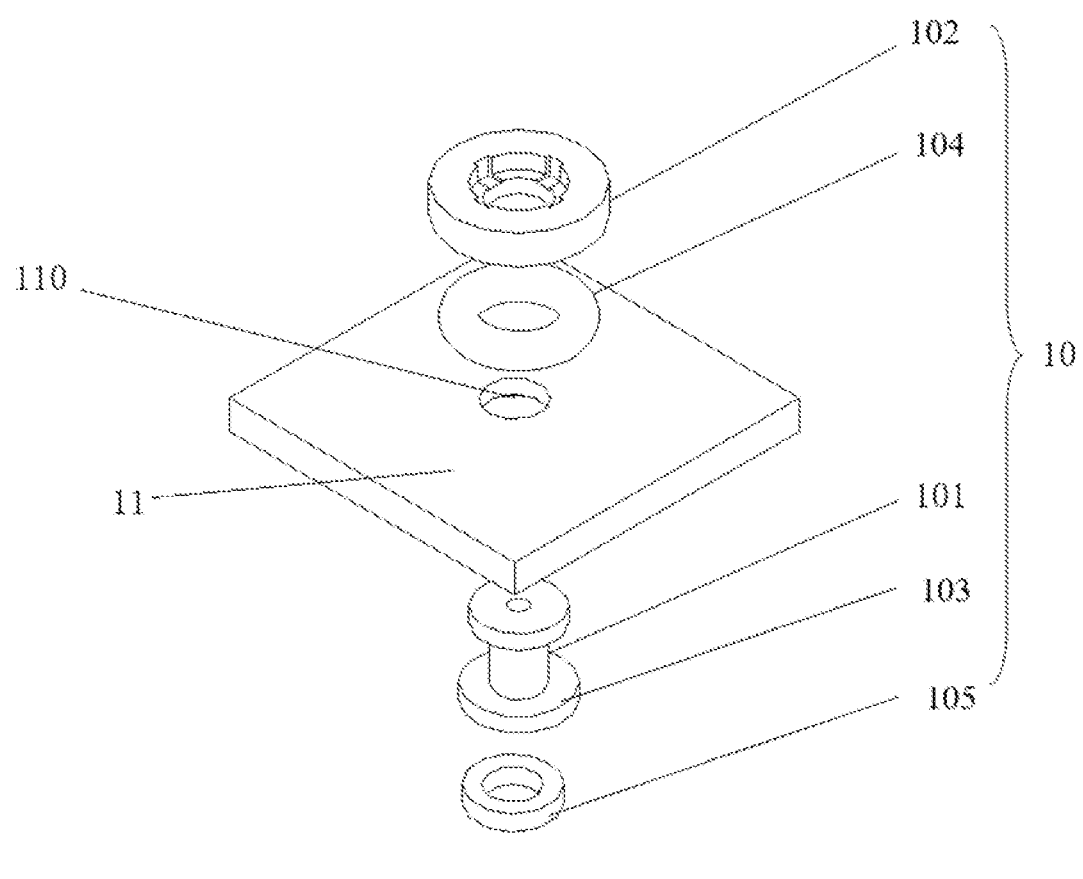
FIG. 4 is a partial schematic exploded view of a degassing apparatus and an end cover plate in an area B of FIG. 3.

In addition, the battery cell also slowly generates gas during normal operating. To prevent the gas from accumulating in the enclosure and breaking through the explosion-proof valve 13 to prevent the battery cell from continuing to be used, degassing needs to be performed for the battery cell. To exhaust such gas for a plurality of times without permanently damaging a sealing structure of the battery cell and improve safety performance and service life of the battery cell, a structure of the degassing apparatus 10 in this embodiment may be shown in FIG. 4. FIG. 4 is a partial schematic exploded view of the degassing apparatus 10 and the end cover plate 11 in an area B in FIG. 3.

Figure 5:
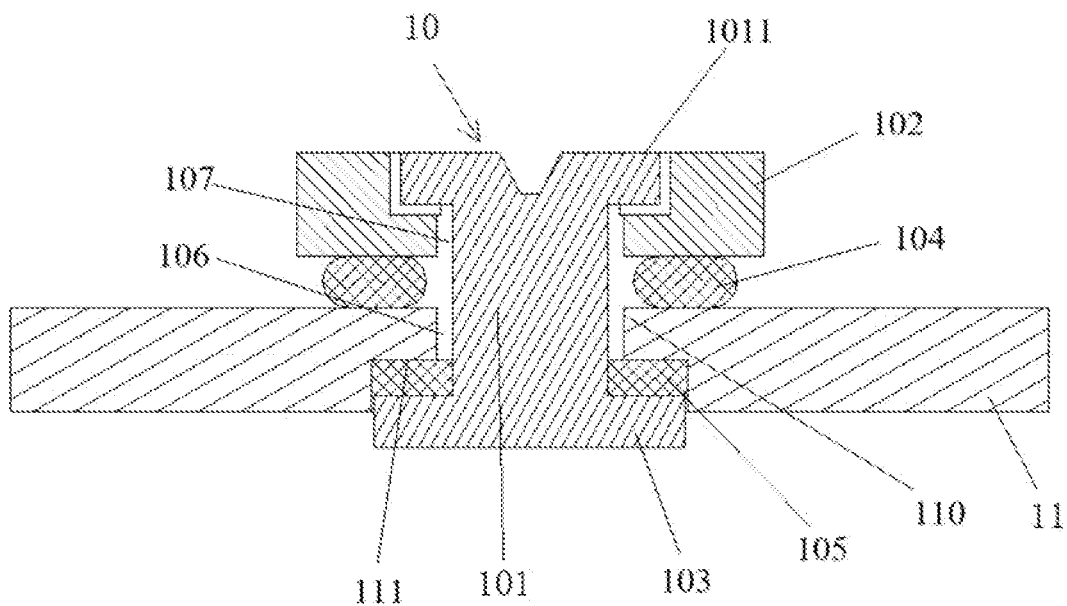
FIG. 5 is a schematic structural cross-sectional view of a degassing apparatus and an end cover plate in a normal state along a direction of a hole axis of a degassing hole according to an embodiment of this application.

As shown in FIG. 4 and FIG. 5, a degassing hole 110 penetrates through the end cover plate 11 along a thickness direction of the end cover plate 11. The degassing hole 110 penetrates through the end cover plate 11 along an axial direction of the degassing hole 110. The degassing hole 110 may be cylindrical or prismatic. In this embodiment of this application, the degassing hole 110 is cylindrical.

The degassing apparatus 10 is mounted in the degassing hole 110. The degassing apparatus 10 includes a columnar portion 101, a first limiting portion 102, a second limiting portion 103, a first elastic member 104, and a second elastic member 105. The columnar portion 101, the first limiting portion 102, and the second limiting portion 103 may all be made of hard materials, for example, a metal material or an alloy material. The columnar portion 101 penetrates through the degassing hole 110 and can move in the degassing hole 110 along the axial direction of the degassing hole. The first limiting portion 102 and the second limiting portion 103 surround an outer peripheral surface of the columnar portion 101 and are respectively located on an outer side and an inner side of the end cover plate 11 along the axial direction of the degassing hole 110. The first elastic member 104 is located between the first limiting portion 102 and the end cover plate 11. The second elastic member 105 is located between the second limiting portion 103 and the end cover plate 11.

The outer side of the end cover plate 11 along the axial direction of the degassing hole 110 is a side away from the electrode assembly 40 when the end cover plate 11 is assembled to the battery cell. The inner side of the end cover plate 11 along the axial direction of the degassing hole 110 is a side close to the electrode assembly 40 when the end cover plate 11 is assembled to the battery cell.

For example, in some embodiments, after the degassing apparatus 10 is assembled in the degassing hole 110, a location sequence of the components of the degassing apparatus 10 and the end cover plate 11 from the outer side of the end cover plate 11 to the inner side of the end cover plate 11 may be as follows: the first limiting portion 102, the first elastic member 104, the end cover plate 11, the second elastic member 105, and the second limiting portion 103. The columnar portion 101 penetrates through the end cover plate 11 along the axial direction of the degassing hole 110, and two ends of the columnar portion 101 are fixedly connected to the first limiting portion 102 and the second limiting portion 103, so that the first limiting portion 102, the second limiting portion 103, and the columnar portion 101 can produce same displacement under an external force.

The same displacement mentioned in this embodiment is a same displacement distance in a same direction.

As shown in FIG. 5, when the degassing apparatus 10 is in a normal state, the second elastic member 105 is in sealed contact with the second limiting portion 103 and the end cover plate 11, keeping the degassing hole 110 in a sealed state.

In this embodiment, the degassing apparatus 10 being in the normal state means that, when a distance between the first limiting portion 102 and the second limiting portion 103 is constant and a thickness of the end cover plate 11 is constant, the first elastic member 104 is located between the first limiting portion 102 and the end cover plate 11 in a compressed state, the second elastic member 105 is located between the second limiting portion 103 and the end cover plate 11 in a compressed state, and an elastic force generated by the first elastic member 104 and an elastic force generated by the second elastic member 105 are balanced, so that a location of the degassing apparatus 10 with respect to the end cover plate 11 is in a stable state.

Figure 6:
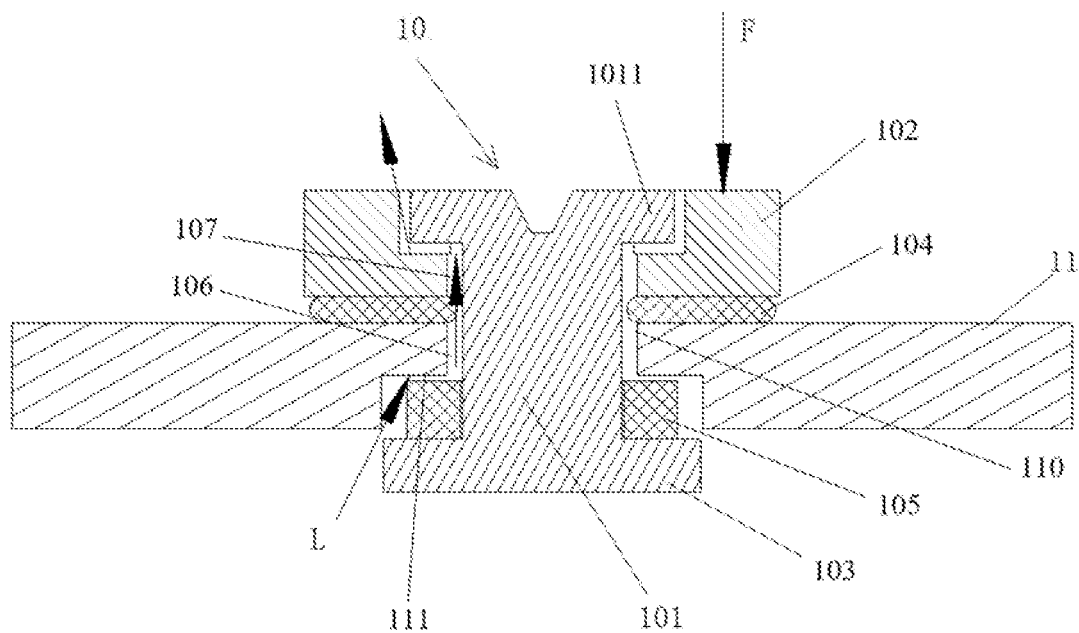
FIG. 6 is a schematic structural cross-sectional view of a degassing apparatus and an end cover in a displaced state under a force F along a direction of a hole axis of a degassing hole according to an embodiment of this application.

With reference to FIG. 6, when a force F toward the end cover plate 11 is applied to the degassing apparatus 10, the first limiting portion 102 and the second limiting portion 103 are configured to produce same displacement, and the force F causes a change of a compression degree of the first elastic member 104 and the second elastic member 105, so that a location of the degassing apparatus 10 with respect to the end cover plate 11 changes, and the first elastic member 104 is at least partially compressed and the second elastic member 105 is at least partially released to undo sealing of the degassing hole 110 by the second elastic member 105. Herein, the releasing sealing of the degassing hole 110 by the second elastic member 105 means that compression of the second elastic member 105 is released to a state in which the degassing hole 110 cannot be pressed against to seal the degassing hole 110. FIG. 6 shows states of components of the degassing apparatus 10 and a gas exhaust direction L when the force F is applied.

In the foregoing state, gas circulates between the inside and the outside of the enclosure through the degassing hole 110, and air inside the enclosure of the battery cell is discharged through the degassing hole 110, thereby reducing pressure in the enclosure and preventing the explosion-proof valve 13 of the battery cell from being broken through to cause permanent damage to the battery cell. In addition, the battery cell is prevented from exploding and causing safety accidents, thereby improving safety of using the battery cell while extending service life of the battery cell.

After the degassing is completed, the external force F applied to the degassing apparatus 10 is canceled, so that the degassing apparatus 10 returns to the normal state shown in FIG. 5 under an action of the elastic forces of the first elastic member 104 and the second elastic member 105 to seal the degassing hole 110 and prevent the electrolyte in the enclosure from leaking, so that the battery cell can continue to be used.

In some embodiments, the external force F applied to the degassing apparatus 10 may be specifically a force applied to the first limiting portion 102 along the axial direction of the degassing hole 110, and the force may be applied by using any tool.

As shown in FIG. 5 and FIG. 6, in the foregoing embodiment, a first degassing gap 106 is provided between the columnar portion 101 and a hole wall of the degassing hole 110, and the first degassing gap 106 allows gas to circulate between the inside and the outside of the end cover plate 11. For example, the first degassing gap 106 is formed through a clearance fit between the columnar portion 101 and the degassing hole 110. In this case, the first degassing gap 106 is ring-shaped. To enable the second elastic member 105 to completely seal the first degassing gap 106, the second elastic member 105 is configured as an elastic seal ring. A material of the elastic seal ring may be fluorine rubber, or may be a rubber material with high stability and high temperature resistance, such as neoprene or butadiene rubber.

The first elastic member 104 may adopt any material and shape that can balance the elastic force of the second elastic member 105. For example, the first elastic member 104 may be a spring that can be compressed along an axial direction of the columnar portion 101. In this case, because the spring cannot implement sealing between the first limiting portion 102 and the end cover plate 11, when the first degassing gap 106 is in an unsealed state, gas in the enclosure is directly exhausted through the first degassing gap 106, thereby implementing degassing for the battery cell.

In another embodiment of this application, the first elastic member 104 may be an elastic seal ring, such as an O-ring. A material of the O-ring is fluorine rubber, or may be a rubber material with high stability and high temperature resistance, such as neoprene or butadiene rubber.

As shown in FIG. 6, when the first elastic member 104 is an elastic seal ring, because the first elastic member 104 can implement sealing between the first limiting portion 102 and the end cover plate 11 in a compressed state, a second degassing gap 107 is provided between the first limiting portion 102 and the columnar portion 101, and gas circulates between the inside and the outside of the end cover plate 11 through the first degassing gap 106 and the second degassing gap 107. When the first degassing gap 106 is in an unsealed state, gas in the enclosure enters the second degassing gap 107 through the first degassing gap 106, and is exhausted out of the battery cell through the second degassing gap 107, thereby implementing degassing for the battery cell.

In this embodiment, the columnar portion 101 may be fixedly connected to the first limiting portion 102 or the second limiting portion 103 through integral molding, riveting, welding, threaded connection, bonding, or the like. To facilitate assembly of the degassing apparatus 10, at least one of the first limiting portion 102 and the second limiting portion 103 is fixedly connected to the columnar portion 101 in a final step of assembling the degassing apparatus 10.

Figure 7:
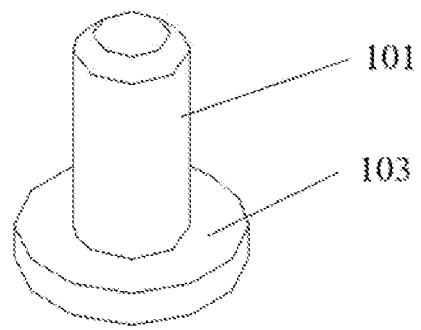
FIG. 7 is a schematic structural diagram of a connection between a columnar portion and a second limiting portion according to an embodiment of this application.

For example, before the degassing apparatus 10 is assembled, the second limiting portion 103 and the columnar portion 101 are integrally molded, or the second limiting portion 103 and the columnar portion 101 are welded or bonded, so that the second limiting portion 103 and the columnar portion 101 are connected in a sealed manner to prevent gas or an electrolyte from flowing between the second limiting portion 103 and the columnar portion 101. For example, a shape obtained by combining the second limiting portion 103 and the columnar portion 101 is a T shape shown in FIG. 7.

Then the columnar portion 101 sequentially penetrates through the second elastic member 105, the degassing hole 110, and the first elastic member 104. The second elastic member 105 may abut against a periphery of the columnar portion 101, and the first elastic member 104 needs to still have a gap with the columnar portion 101 when being compressed to a limit, so that gas can circulate between the first degassing gap 106 and the second degassing gap 107.

Finally, the first limiting portion 102 is fixedly mounted to the columnar portion 101 to complete mounting of the degassing apparatus 10, where a fixing manner may be one of riveting, welding, bonding, or threaded connection. It needs to be ensured that at least the second elastic member 105 is in a specific compressed state after the first limiting portion 102 is fixed to the columnar portion 101, to ensure that the second elastic member 105 seals the degassing hole 110 in a normal state. Alternatively, both the first elastic member 104 and the second elastic member 105 may be in a compressed state, so that the second elastic member 105 seals the degassing hole 110 more stably in a normal state.

The second degassing gap 107 may be provided between the first limiting portion 102 and the columnar portion 101, as shown in FIG. 6.

Alternatively, the second degassing gap 107 may be a through-hole provided on the columnar portion 101, or a through-hole provided on the first limiting portion 102, provided that gas can circulate between each of two ends of the through-hole and each of the first degassing gap 106 and the outside of the battery cell.

When the second degassing gap 107 is provided between the columnar portion 101 and the first limiting portion 102, the first limiting portion 102 and the columnar portion 101 are not integrally molded. To be specific, the first limiting portion 102 and the columnar portion 101 are connected through riveting, welding, bonding, or threaded connection, and in this connection manner, a gap for gas circulation, that is, the second degassing gap 107, can be formed between the first limiting portion 102 and the columnar portion 101.

Figure 8:
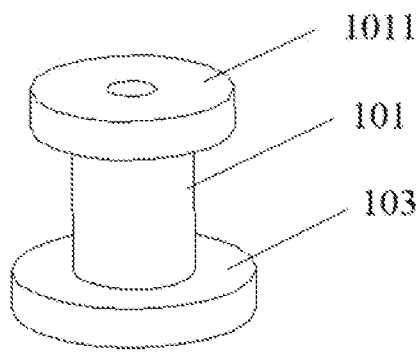
FIG. 8 is a schematic structural diagram of a riveted structure formed by compressing a columnar portion according to an embodiment of this application.

In this embodiment, to simplify an assembly process of the end cover assembly 1 and reduce costs, the columnar portion 101 and the first limiting portion 102 are connected through riveting. Specifically, the first limiting portion 102 is provided with a mounting through-hole 1021, the columnar portion 101 is inserted into the mounting through-hole 1021, and an end of the columnar portion 101 is compressed to form a rivet joint 1011 to prevent the first limiting portion 102 from detaching from the columnar portion 101. The columnar portion 101 and the mounting through-hole 1021 are in clearance fit to form the second degassing gap 107. A structure of the compressed columnar portion is shown in FIG. 8.

Figure 9:
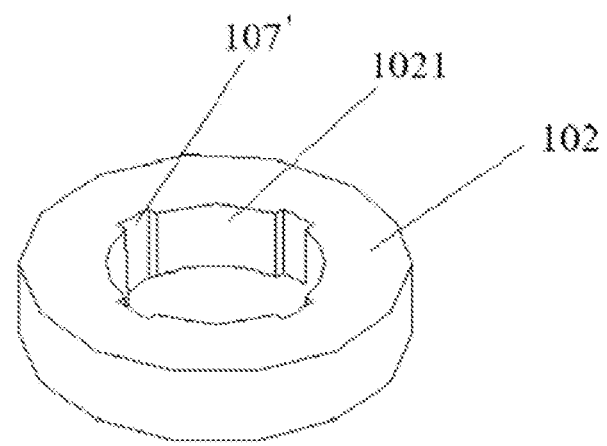
FIG. 9 is a schematic structural diagram of a first limiting portion without a first groove according to an embodiment of this application.

Alternatively, as shown in FIG. 9, to increase the amount of exhausted gas, the second degassing gap 107 may be alternatively a recessed portion 107 formed into a hole wall of the mounting through-hole. The recessed portion 107' is recessed away from the columnar portion 101, and extends from a side close to the first elastic member 104 to a side away from the second elastic member 105. A cross-sectional shape of the recessed portion 107' in a direction perpendicular to an extending direction of the recessed portion 107' may be a smooth arc, or may include a plurality of line segments, where there is a specific included angle between different line segments. For example, the cross-sectional shape of the recessed portion 107 shown in FIG. 9 is a shape including three line segments and two right included angles. One or more recessed portions 107 may be provided. When a plurality of recessed portions 107 are provided, the plurality of recessed portions 107 may be evenly distributed around a periphery of the mounting through-hole 1021, so that the plurality of recessed portions 107 evenly exhaust gas around the mounting through-hole 1021.

Figure 10:
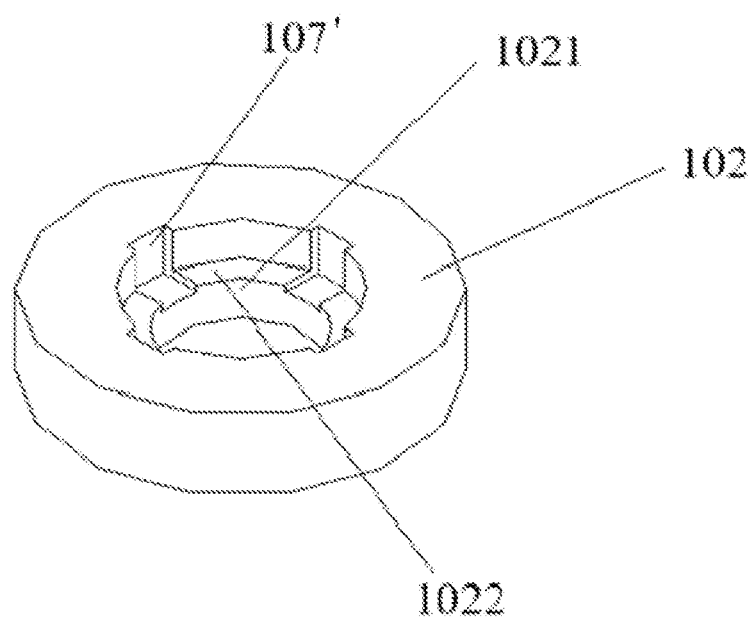
FIG. 10 is a schematic structural diagram of a first limiting portion provided with a first groove according to an embodiment of this application.

As shown in FIG. 10, to reduce an overall volume of the battery cell and help determine a compression degree at the end of the columnar portion 101, in some embodiments, the first limiting portion 102 is provided with a first groove 1022. The first groove 1022 is provided around a periphery of the mounting through-hole 1021, and the columnar portion 101 is at least partially located in the first groove 1022. For example, the rivet joint 1011 at the end of the columnar portion 101 is located in the first groove 1022. During compression of the columnar portion 101, whether the columnar portion 101 is compressed in place is determined by observing a degree of the columnar portion 101 sinking into the first groove 1022. In addition, when the end of the columnar portion 101 is located in the first groove 1022, a plane is formed between the end of the columnar portion 101 and an upper surface of the first limiting portion 102, the overall volume of the battery cell is reduced, and a surface of the enclosure is more smooth and aesthetically pleasing. The first limiting portion 102 in FIG. 4. FIG. 5, and FIG. 6 adopts this structure.

To prevent the compressed rivet joint 1011 from obstructing gas circulation between the second degassing gap 107 and the outside of the battery cell, the recessed portion 107 is not only provided into the hole wall of the mounting through-hole 1021, but also extends to a groove wall of the first groove 1022. That is, when reaching the groove wall of the first groove 1022, the recessed portion 107 is recessed in a direction in which the groove wall of the first groove 1022 leaves the columnar portion 101. Therefore, even if the rivet joint 1011 is close to the groove wall of the first groove 1022, the recessed portion 107 can still exhaust gas out of the battery cell through the first degassing gap 106 to ensure smooth degassing of the degassing apparatus 10.

As shown in FIG. 5 and FIG. 6, a second groove 111 is provided in the end cover plate 11 at a location corresponding to the second elastic member 105, the second groove 111 is provided around a periphery of the degassing hole 110, and the second elastic member 105 is located at least in the second groove 111, or the second limiting portion 103 may be at least partially located in the second groove 111. A shape of the second groove 111 is adapted to the second limiting portion 103. For example, the second limiting portion 103 is cylindrical, and the second groove 111 is a cylindrical groove whose diameter is greater than that of the second limiting portion 103; or both are polygons on a cross section perpendicular to an axial direction, but a contour of the second groove 111 needs to be greater than that of the second limiting portion 103, to ensure that the second limiting portion 103 can freely press against the second elastic member 105 under an action of the first elastic member 104, and ensure an effect of sealing the first degassing gap 106 by the second elastic member 105.

The second groove 111 is provided, so that a volume occupied by the degassing apparatus 10 in the enclosure can be reduced, and the volume of the battery cell is further reduced.

To sum up, in the end cover assembly 1 provided in the foregoing embodiment of this application, an end cover plate 11 with a degassing hole 110 and a degassing apparatus 10 are provided, and the degassing apparatus 10 is mounted in the degassing hole 110 in the end cover plate 11. In a normal state, the degassing apparatus 10 can seal the degassing hole 110 to prevent circulation of substances (electrolyte, gas, and, the like) between the inside and the outside of the battery cell. When degassing is required, a force toward the end cover plate 11 is applied to the degassing apparatus 10 to undo the sealing of the degassing hole 110 by the degassing apparatus 10, allowing gas to circulate between the inside and the outside of the enclosure of the battery cell through the degassing hole 110. After the degassing ends, the force applied to the degassing apparatus 10 is removed, the degassing apparatus 10 can return to the normal state again to seal the degassing hole 110 and avoid electrolyte leakage, and the battery cell can continue to be used.

Therefore, when the end cover assembly 1 in this application is used for the battery cell, a plurality of degassing processes is allowed for the battery cell, without causing permanent damage to the battery cell, thereby increasing service life of the battery cell while ensuring safety of using the battery cell.

FIG. 11 is a flowchart of a degassing method for the battery cell in the foregoing embodiment according to another embodiment of this application. The degassing method includes the following steps.

S401. Apply a force F toward the end cover plate 11 to the degassing apparatus 10, so that the first limiting portion 102 and the second limiting portion 103 produce same displacement, and the fir elastic member 104 is at least partially compressed and the second elastic member 105 is at least partially released to undo sealing of the degassing hole 110 in the end cover plate 11 by the second elastic member 105, allowing gas to circulate between the inside and the outside of the housing 20 of the battery cell through the degassing hole 110.

S402. Remove the force applied to the degassing apparatus 10 to bring the degassing apparatus 10 back to a normal state, where the second elastic member 105 is in sealed contact with the second limiting portion 103 and the end cover plate 11, keeping the degassing hole 110 in a sealed state.

In some embodiments, in step S401, the force F applied to the degassing apparatus 10 may be specifically a force F applied to the first limiting portion 102 by using any tool.

To prevent friction between the columnar portion 101 and the hole wall of the degassing hole 110, in some embodiments, the force F applied to the degassing apparatus 10 may be specifically a force F parallel or substantially parallel to the axial direction of the degassing hole 110.

A battery 200 including the battery cell in the foregoing embodiment of this application also has an advantage of extending service life of the battery 200 while ensuring safety of using the battery 200.

FIG. 12 is a schematic structural diagram of a battery 200 according to another embodiment of this application. The battery 200 includes a first case 201, a second case 202, and a plurality of battery modules 300. The first case 201 and the second case 202 are buckled with each other. The plurality of battery modules 300 are arranged in space enclosed by the first case 201 and the second case 202. In some embodiments, the first case 201 and the second case 202 are connected in a sealed manner.

Figure 13:
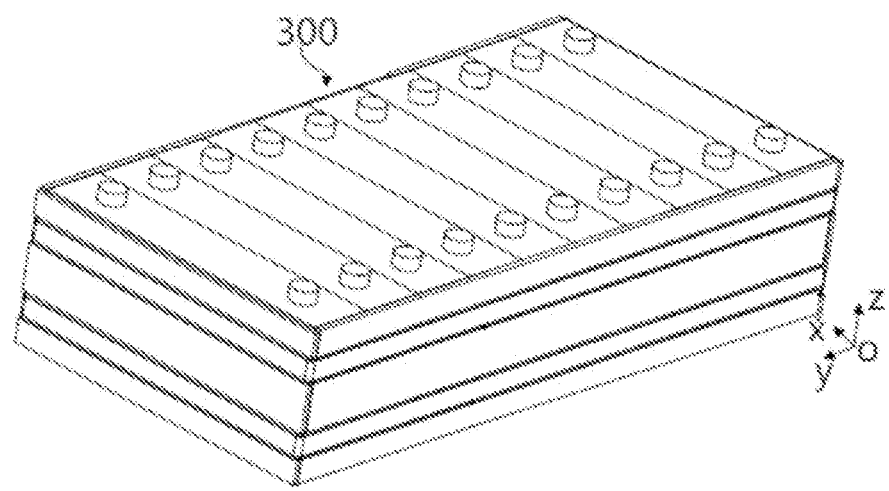
FIG. 13 is a schematic structural diagram of a battery module according to an embodiment of this application.

As shown in FIG. 13, the battery module 300 includes a plurality of battery cells, and the plurality of battery cells may be electrically connected in series, in parallel, or in series-parallel to achieve a relatively large current or voltage. The series-parallel connection is a combination of series and parallel connections. For example, as shown in FIG. 13, the battery cells may be laid upright, a height direction of the battery cell is consistent with a vertical direction, and the plurality of battery cells are arranged side by side along a width direction; or the battery cells may be laid flat, a width direction of the battery cells is consistent with the vertical direction, the plurality of battery cells may be stacked on at least one layer along the width direction, and each layer includes a plurality of battery cells arranged along a length direction.

In another embodiment of this application, according to a electricity demand of an electric apparatus, a plurality of batteries are interconnected to form a battery group for supplying power to the electric apparatus. In another embodiment of this application, the battery group may be alternatively accommodated in a case and packaged. For brevity of description, the following embodiments are described by using an example in which the electric apparatus includes a battery.

Another embodiment of this application further provides a apparatus using a battery, including the battery in the foregoing embodiment. The battery 200 used for the electric apparatus may be the battery 200 described in the embodiment corresponding to FIG. 12. Details are not described herein again. The battery provides electric energy for the electric apparatus, and drives the electric apparatus to move by using a motor. The apparatus may be an electric vehicle, an electric train, an electric bicycle, a golf cart, a ship, or the like, and the electric apparatus may be an apparatus powered only by the battery in the foregoing embodiment, or may be a hybrid electric apparatus.

Figure 14:
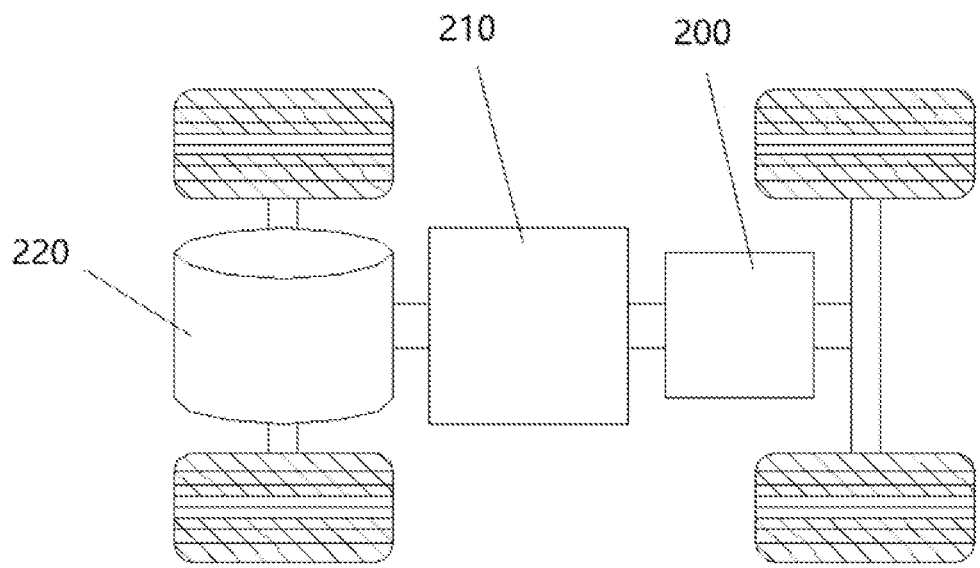
FIG. 14 is a schematic structural diagram of an electric apparatus according to an embodiment of this application.

For example, FIG. 14 is a schematic structural diagram of an electric apparatus according to an embodiment of this application. The electric apparatus may be a vehicle. The vehicle may be an oil-fueled vehicle, a gas-fueled vehicle, or a new energy vehicle. The new energy vehicle may be a battery electric vehicle, a hybrid electric vehicle, an extended-range vehicle, or the like. The vehicle includes a battery 200, a controller 210, and a motor 220. The battery 200 is configured to supply power to the controller 210 and the motor 220 as an operating power source and a driving power source of the vehicle. For example, the battery 200 is configured to meet an operating power requirement of the vehicle during startup, navigation, and operating. For example, the battery 200 supplies power to the controller 210, and the controller 210 controls the battery 200 to supply power to the motor 220. The motor 220 receives and uses the power of the battery 200 as a driving power source for the vehicle, to replace or partially replace fuel or natural gas to provide driving power for the vehicle.

Persons skilled in the art can understand that, although some embodiments herein include some features included in other embodiments but not other features, a combination of features of different embodiments means that they are within the scope of this application and form different embodiments. For example, any one of the embodiments claimed in the claims may be used in any combination.

To sum up, the foregoing embodiments are merely intended for describing the technical solutions of this application, instead of limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An end cover assembly of a battery cell, configured to seal a housing of the battery cell, and comprising:
    an end cover plate provided with a degassing hole, wherein the degassing hole penetrates through the end cover plate along an axial direction of the degassing hole; and
    a degassing apparatus mounted in the degassing hole, wherein the degassing apparatus comprises a columnar portion, a first limiting portion, a second limiting portion, a first elastic member, and a second elastic member, the columnar portion penetrates through the degassing hole, the first limiting portion and the second limiting portion surround an outer peripheral surface of the columnar portion and are respectively located on an outer side and an inner side of the end cover plate along the axial direction of the degassing hole, the first elastic member is located between the first limiting portion and the end cover plate, and the second elastic member is located between the second limiting portion and the end cover plate; and
    when the degassing apparatus is in a normal state, the second elastic member is in sealed contact with the second limiting portion and the end cover plate, keeping the degassing hole in a sealed state; or when the degassing apparatus experiences a force toward the end cover plate, the first limiting portion and the second limiting portion are configured to produce same displacement, and the first elastic member is at least partially compressed and the second elastic member is at least partially released to undo sealing of the degassing hole by the second elastic member, allowing gas to circulate between the inside and the outside of the housing through the degassing hole.

2. The end cover assembly according to claim 1, wherein a first degassing gap is provided between the columnar portion and a hole wall of the degassing hole, and the first degassing gap allows gas to circulate between the inside and the outside of the end cover plate.

3. The end cover assembly according to claim 2, wherein the columnar portion and the degassing hole are in clearance fit to form the first degassing gap.

4. The end cover assembly according to claim 2, wherein the first limiting portion is provided with a mounting through-hole, and the columnar portion is inserted into the mounting through-hole and fixedly connected to the first limiting portion; and
    a second degassing gap is provided between the first limiting portion and the columnar portion, and gas circulates between the inside and the outside of the end cover plate through the first degassing gap and the second degassing gap.

5. The end cover assembly according to claim 4, wherein the first limiting portion and the columnar portion are in clearance fit to form the second degassing gap.

6. The end cover assembly according to claim 4, wherein the second degassing gap is a recessed portion formed into a hole wall of the mounting through-hole, and the recessed portion is recessed away from the columnar portion.

7. The end cover assembly according to claim 4, wherein the first limiting portion is provided with a first groove, the first groove is provided around a periphery of the mounting through-hole, and the columnar portion is at least partially located in the first groove.

8. The end cover assembly according to claim 1, wherein a second groove is provided in the end cover plate at a location corresponding to the second elastic member, the second groove is provided around a periphery of the degassing hole, and the second elastic member is at least partially located in the second groove.

9. The end cover assembly according to claim 1, wherein the first elastic member and the second elastic member are both made of fluorine rubber.

10. A battery cell, comprising an electrode assembly, a housing, and the end cover assembly according to claim 1, wherein
    the housing is a hollow chamber with an opening, and the end cover assembly and the housing are combined at the opening to form a space for accommodating the electrode assembly.

11. A degassing method for the battery cell according to claim 10, comprising:
    applying a force toward the end cover plate to the degassing apparatus, so that the first limiting portion and the second limiting portion produce same displacement, and the first elastic member is at least partially compressed and the second elastic member is at least partially released to undo sealing of the degassing hole in the end cover plate by the second elastic member, allowing gas to circulate between the inside and the outside of the housing of the battery cell through the degassing hole; and
    removing the force applied to the degassing apparatus to bring the degassing apparatus back to a normal state, wherein the second elastic member is in sealed contact with the second limiting portion and the end cover plate, keeping the degassing hole in a sealed state.

12. The degassing method according to claim 11, wherein the force is applied to the first limiting portion.

13. The degassing method according to claim 11, wherein the force is parallel to an axial direction of the degassing hole.

* * * * *